INVENTORS
L.E. SCOGGINS
T.A. YOKLEY, JR.

BY

ATTORNEYS

INVENTORS
L.E. SCOGGINS
T.A. YOKLEY, JR.

BY Young & Quigg

ATTORNEYS 3,367,989
COMPLEXES OF PHOSPHONIUM COMPOUNDS WITH TRIALKYLALUMINUMS AND USES THEREFOR
Lacey E. Scoggins and Tommey A. Yokley, Jr., Bartlesville, Okla., assignors to Phillips Petroleum Company, a corporation of Delaware
Filed May 8, 1964, Ser. No. 366,043
7 Claims. (Cl. 260—683.15)

ABSTRACT OF THE DISCLOSURE

Phosphonium compounds of the formula $(R)_4PX$ wherein R is an alkyl, aryl, aralkyl, alkaryl or cycloalkyl radical and X is chlorine, bromine or iodine form complexes with 1 and 2 mols of trialkylaluminum compounds. The complexes can be utilized for the separation of trialkylaluminums from mixtures of hydrocarbons and also used in a growth reaction wherein olefins are reacted with trialkylaluminums to form higher trialkylaluminums which are subsequently displaced to triethylaluminum and high molecular weight 1-olefins.

---

Figure 1:
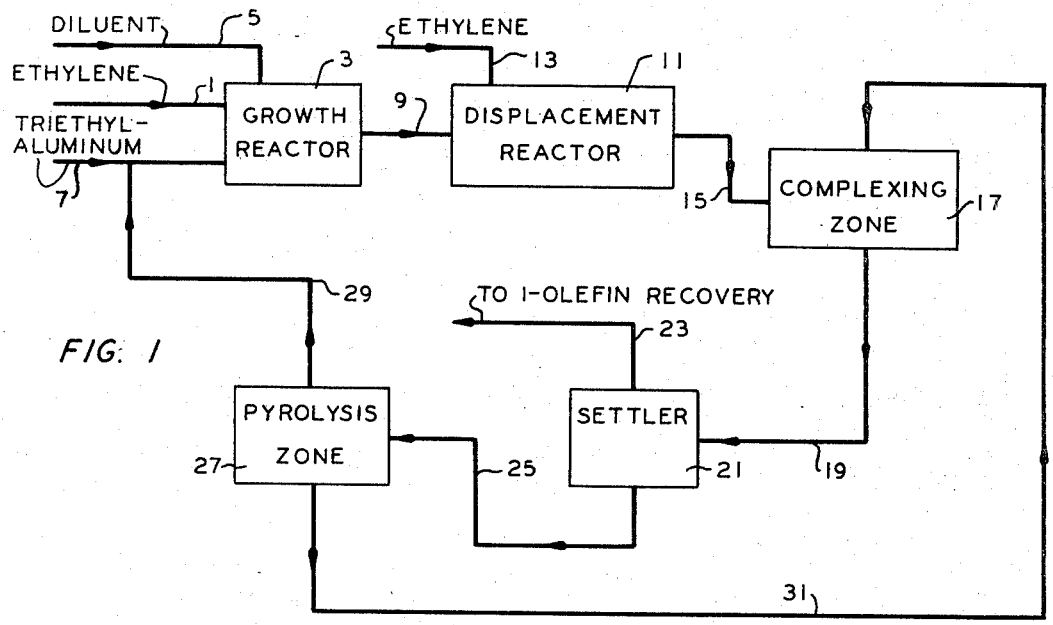

This invention relates to a novel process for the production of 1-olefins. In one aspect, this invention relates to a method for the separation of trialkylaluminums from 1-olefins produced by forming novel complexes with the trialkylaluminum compound. In another aspect, this invention relates to novel trialkylaluminum complexes for use in the formation and recovery of 1-olefins.

Many processes for the production of 1-olefins by a so-called "growth" reaction of ethylene with trialkylaluminums are now known in the art. Following the growth reaction the resulting high molecular weight trialkylaluminums are converted to trialkylaluminum and 1-olefins having a chain length equal to the length of the alkyl groups of the alkylaluminum by a displacement reaction with a lower 1-olefin such as ethylene, propylene or 1-butene. Such a process is disclosed in U.S. 2,781,410, wherein trialkylaluminum reacts with ethylene in a "growth" reaction step to produce tri-n-alkylaluminum compounds with chain lengths determined primarily by the amount of ethylene reacted. For example, the growth reaction of trialkylaluminum and ethylene takes place according to the following formula:

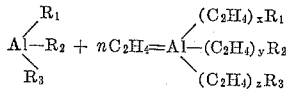

wherein $R_1$, $R_2$ and $R_3$ are of similar or dissimilar lower alkyl radicals, preferably of 2 to 4 carbon atoms, and $x+y+z=n$. Usually $n$ is about 12 to 30.

This reaction is then followed in a separate step by a "displacement" reaction in the presence of a lower 1-olefin such as ethylene, propylene or 1-butene, which can be a thermal displacement or one catalyzed by a metal such nickel, whereby the alkyl residues, $-(C_2H_4)_xR_1$, $-(C_2H_4)_yR_2$ and $-(C_2H_4)_zR_3$, in the above formula are displaced by 1-olefins to produce 1-olefins of the same number of carbons as the substituent alkyl group and to form trialkylaluminums wherein the alkyl groups contain the same number of carbons as the 1-olefin displacing agent. Since the length of the alkyl groups formed in the "growth" reaction is a function of the mol ratio of ethylene reacted with the trialkylaluminum present, the result is that the amounts of the various olefins produced by the "displacement reaction" follow a normal Poisson distribution.

While this type of process may appear to be an ideal system for the preparation of 1-olefins from ethylene, the problem of separating trialkylaluminums from the produced 1-olefins greatly complicates the situation. For example, triethylaluminum boils intermediate 1-dodecene and 1-tetradecene, and therefore separation by distillation is extremely difficult.

Accordingly, an object of this invention is to provide a novel method for the separation of trialkylaluminums from mixtures with 1-olefins. Another object of the invention is to provide novel complexes of trialkylaluminums which can be readily separated from mixtures with 1-olefins. A still further object is to provide a new growth process for the conversion of ethylene to higher 1-olefins wherein novel complexes are grown.

Other objects, advantages and features of the invention will be readily apparent to those skilled in the art from the following description, the drawing, and the claims.

In accordance with this invention we have now discovered that phosphonium compounds of the formula $(R)_4PX$, wherein each R is selected from the group consisting of alkyl, aryl, aralkyl, alkaryl and cycloalkyl radicals and combinations thereof containing from 1 to 10 carbon atoms and X is selected from the group consisting of Cl, Br and I, form complexes with 1 and 2 mols of trialkylaluminum of the formula $(R')_3Al$ wherein each R' is an alkyl radical generally containing from 1 to 20 carbon atoms or higher, preferably containing from 1 to 6 carbon atoms.

As defined, 1 mol of the above-described phosphonium compounds forms complexes with 1 or 2 mols of the described trialkylaluminum. When the $(R')_3Al$ compounds which are complexed are trimethylaluminum, triethylaluminum, tripropylaluminum or tributylaluminum, both the 1:1 and 1:2 complexes $[(R)_4PX:(R)_3Al]$ are substantially insoluble in hydrocarbons. Complexes with higher trialkylaluminums are substantially completely soluble in hydrocarbons. As shown hereinafter, the 1:2 complexes can be pyrolyzed to the 1:1 complex liberating 1 mol of $(R')_3Al$ compound. The 1:2 complexes will "grow" when reacted with ethylene, and the growth product can be converted to insoluble complex by reaction with a low molecular weight trialkylaluminum or by displacement with ethylene or other low molecular weight olefins.

The formation of the complexes of this invention can be carried out by contacting a phosphonium compound of the type previously defined with one or more mols of $(R')_3Al$ compound at a temperature of from about $-10$ to about 150° C. Examples of compounds of the formula $(R)_4PX$ which can be employed in the complexes of this invention are: tetramethylphosphonium chloride, methyl tri-n-butylphosphonium iodide, ethyl tri-n-decylphosphonium bromide, tetradecylphosphonium chloride, methyl triphenylphosphonium bromide, ethyl tri(4-butylphenyl) phosphonium iodide, tetracyclohexylphosphonium chloride, methyl tricyclodecylphosphonium iodide, and the like.

Some examples of compounds of the formula $(R')_3Al$ which are complexed with phosphonium compounds are trimethylaluminum, triethylaluminum, triisobutylaluminum, tri-n-hexylaluminum, tri-n-eicosylaluminum and the like.

The complexes of this invention are preferably employed for use in growth and displacement reactions wherein ethylene is converted to higher 1-olefins. The complex of 1 mol of phosphonium compound with 2 mols of $(R')_3Al$ compound will "grow" in the presence of excess ethylene. The growth reaction is normally carried out under ethylene pressure of from about 400 to 2400 p.s.i.g. at temperatures from about 145° C. up to the decomposition temperature of the complex, approximately 300° C.

at these pressures. Following the growth reaction displacement can be effected in several ways. In one method, thermal displacement under 50 to 100 p.s.i.g. ethylene pressure is effected at from about 225 to 275° C., although this thermal displacement can be carried out in the absence of ethylene. However, in the presence of ethylene, the reacted or displaced complex yields high molecular weight 1-olefins and a complex of the phosphonium compound with 2 mols of triethylaluminum. This complex is immiscible with the diluent and 1-olefins and can be readily separated therefrom.

In another method of displacement the growth product complex is contacted with at least 2 mols of triethylaluminum per each mol of phosphonium compound present. This reaction is conducted at from about 25° C. up to the decomposition temperature of the complex. This exchange gives a practically quantitative yield of the immiscible complex of the phosphonium compound with 2 mols of triethylaluminum. This complex can be separated and recycled to the growth step, while the higher trialkylaluminum compounds formed by the exchange reaction can be readily stripped to remove free 1-olefins and subjected to thermal displacement at 250 to 320° C. to form 1-olefins and triethylaluminum.

In addition, these complexes are suitable for use in a one-step growth process, carried out at conditions under which growth and displacement occur simultaneously. Under such conditions, the productivity is sufficiently high that the reaction mixture can be subjected to hydrolysis.

Figure 2:
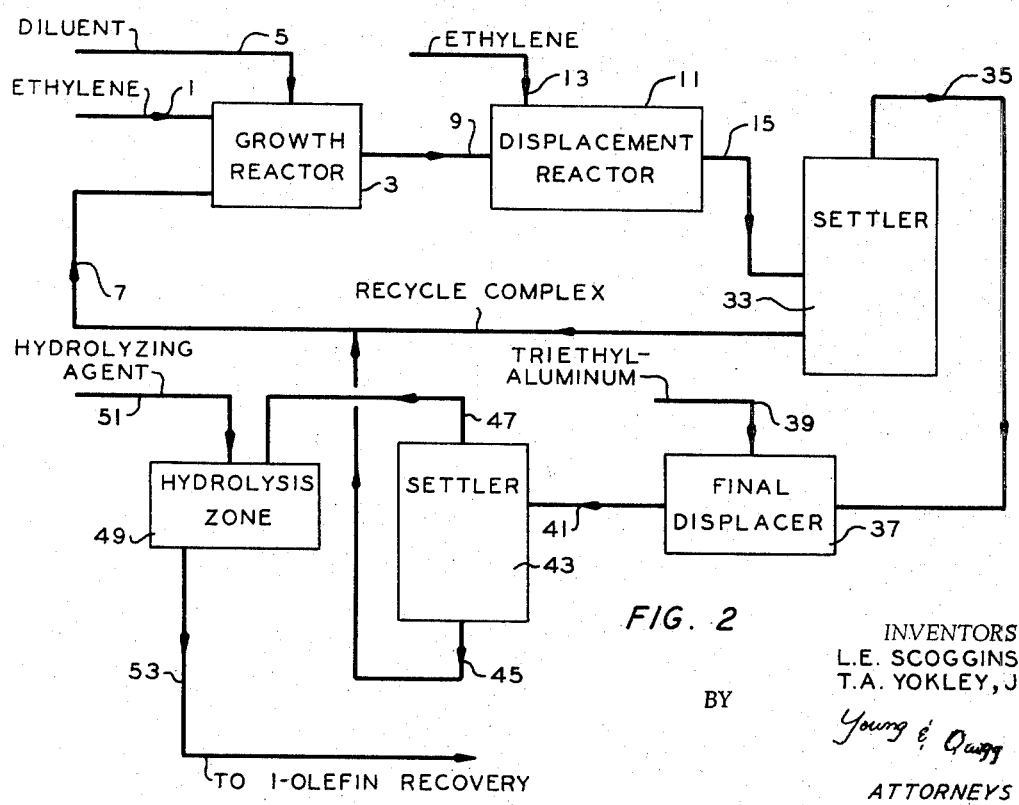
Figure 3:
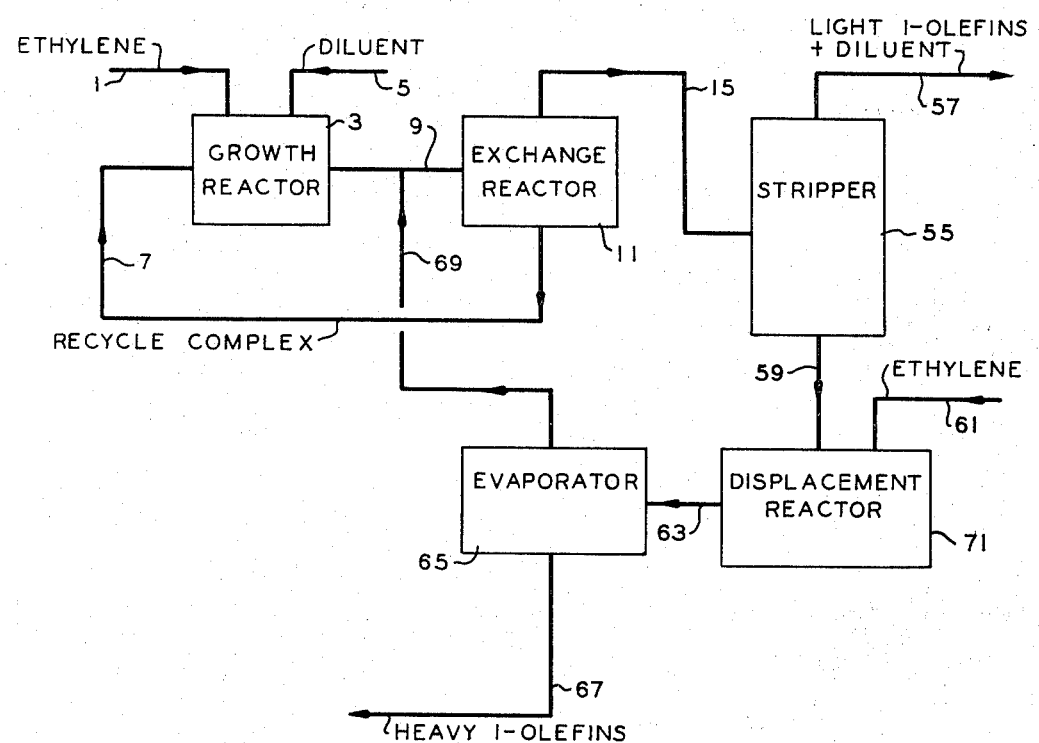

In the drawings, FIGURES 1, 2, and 3 are flow sheets of the process of the invention, illustrating three embodiments in which the inventive complexes are utilized in systems wherein ethylene is converted to higher 1-olefins by a "growth" reaction.

As shown in FIGURE 1, ethylene is fed via line 1 to growth reactor 3, and diluent and triethylaluminum are simultaneously fed via lines 5 and 7, respectively. Growth reactor 3 is operated at approximately 2,000 p.s.i.g. and 120° C. so that the triethylaluminum is converted to higher molecular weight trialkylaluminums. The reaction mixture leaving reactor 3 passes via line 9 to displacement reactor 11. Additional ethylene is pressured into reactor 11 via line 13. In reactor 11, the temperature is raised to approximately 250° C. and the pressure is decreased to about 100 p.s.i.g. so as to convert the higher molecular weight trialkylaluminums to triethylaluminum and 1-olefins. The resulting mixture of diluent, triethylaluminum and 1-olefins passes via line 15 to complexing zone 17. In this zone, the reaction mixture is contacted with 1:1 methyl triphenylphosphonium bromide:triethylaluminum complex. This results in the formation of the insoluble complex of 2 mols of triethylaluminum with 1 mol of the phosphonium compound. The resulting mixture passes via line 19 to settler 21 wherein the insoluble complex settles out. In settler 21, the upper phase comprises diluent and 1-olefins. This material can be removed via line 23 to a recovery zone (not shown). A bottom phase in settler 21, the immiscible complex, is removed via line 25 to pyrolysis zone 27 wherein an elevated temperature is utilized to decompose the complex to 1 mol of triethylaluminum and 1 mol of the complex of the phosphonium compound with 1 mol of triethylaluminum. The triethylaluminum is removed via line 29 and recycled to line 7 for recharging to the growth reactor. The remaining material from the pyrolysis zone is withdrawn via line 31 and recycled to complexing zone 17. By operating in this manner the difficulties encountered in the separation by distillation of triethylaluminum from 1-olefins boiling at approximately the same temperature as the triethylaluminum are avoided.

In another embodiment, the complex of 1 mol of a phosphonium compound with 2 mols of triethylaluminum is employed in the growth reaction. Referring to FIGURE 2, in which the growth and displacement reactions are operated at the same conditions described in FIGURE 1, diluent and ethylene are fed via lines 1 and 5 to growth reactor 3. Simultaneously, the complex of 1 mol of the phosphonium compound and 2 mols of triethylaluminum from the settler 33 are fed via line 7 to reactor 3. In reactor 3, the triethylaluminum which is complexed with the phosphonium compound is converted to higher molecular weight trialkylaluminum and remains complexed with the phosphonium compound. This mixture passes via line 9 to displacement reactor 11 and additional ethylene is charged to reactor 11 via line 13. This displacement results in the formation of 1-olefins and the insoluble complex of 2 moles of triethylaluminum with 1 mol of the phosphonium compound. This mixture passes via line 15 to settler 33, and the insoluble complex is drawn off the bottom of settler 33 for recycle to the growth reactor. The upper phase in settler 33 comprises diluent, 1-olefins and some undisplaced complex of phosphonium compound with higher trialkylaluminums. This complex is soluble in the diluent—1-olefin mixture. The upper phase is withdrawn via line 35 to final displacer 37, wherein it is contacted with triethylaluminum fed to displacer 37 via line 39. The contacting of the undisplaced complex with the triethylaluminum results in the formation of insoluble 1:2 phosphonium complex with triethylaluminum and also forms higher molecular weight trialkylaluminum compounds. This mixture passes via line 41 to settler 43 wherein the insoluble complex settles out. This complex is removed via line 45 and is recycled to line 7. The upper phase, comprising 1-olefins, diluent and a minor amount of trialkylaluminum, is withdrawn via line 47 to hydrolysis zone 49. In this zone, the higher trialkylaluminums are hydrolyzed by contact with a hydrolyzing agent such as hydrochloric acid supplied via line 51. The resulting material is withdrawn via line 53 and passed to a 1-olefin recovery system (not shown).

Another embodiment of the invention involving growth of the complex is shown in FIGURE 3. In FIGURE 3, ethylene and diluent are fed via lines 1 and 5 to growth reactor 3. Simultaneously, the complex of 2 mols of triethylaluminum with 1 mol of the phosphonium compound from the exchange reactor 11 is fed to reactor 3 via line 7. The effluent from reactor 3 passes via line 9 to exchange reactor 11. In line 9, triethylaluminum, supplied via line 69, is mixed with the growth product, and the exchange reaction between the triethylaluminum and the higher complex takes place in reactor 11 at about 20 to 50° C. This results in the formation of the insoluble complex 2:1 phosphonium:TEA which is withdrawn from reactor 11 via line 7 and is recycled to the growth reactor. The upper phase in reactor 11, comprising diluent, 1-olefins from displacement occurring during growth, and higher trialkylaluminums, passes via line 15 to stripper 55. The 1-olefins, boiling below the trialkylaluminums, are withdrawn as overhead from this column while the bottoms are withdrawn via line 59 to a thermal displacement reactor 71. As in the displacement reactor of FIGURE 1, the trialkylaluminums are converted to triethylaluminum and 1-olefins by contact with ethylene supplied via line 61. The resulting mixture passes via line 63 to evaporator 65, wherein the material boiling up through triethylaluminum is withdrawn as overhead via line 69. This material is recycled to the exchange reactor, thus supplying triethylaluminum for the exchange reaction. No regrowth of recycled 1-olefins occurs in exchange reactor 11 because of the low operating temperature. The 1-olefins boiling above triethylaluminum are withdrawn from the evaporator via line 67.

The above-described figures illustrate three embodiments of the invention. The following specific examples illustrate other advantages, but it is not intended that the invention be limited to the features of the drawings and the examples.

*Example I*

A 1:1 complex was formed by reacting triethylaluminum with methyl triphenylphosphonium bromide. At this time 63.7 grams of the soluble complex was contacted with a solution of 11.2 grams of triethylaluminum in 56.2 grams of 1-dodecane and 16.5 grams of isopentane. A complex phase settled out and was separated off. The insoluble phase was washed twice using 50 ml. of isopentane in each wash. These washings were combined with the upper phase from the phase separation, and the isopentane was then evaporated off. Approximately 2 grams of additional complex was separated from this upper phase after isopentane evaporation.

The insoluble complex was then pyrolyzed at a pot temperature of 190° C. and a pressure of 12 mm. Hg absolute for 1.5 hours. The amount of recovered triethylaluminum from the pyrolysis was 10.84 grams, which contained approximately 1 percent of 1-dodecene. The pyrolysis residue comprised 61.7 grams. The olefin phase amounted to 55.2 grams and analyzed 0.284 gram aluminum. The over-all material balance on this separation was 98.7 percent.

The pyrolyzed complex was subsequently used in two more separation cycles with essentially the same results.

*Example II*

A run was carried out in which one of the complexes of the invention was utilized in a growth reaction.

A mixture comprising 0.357 mol of triethylaluminum and 0.146 mol of methyl triphenylphosphonium bromide was contacted with ethylene at 900 p.s.i.g., heated to 140° C., and maintained at this temperature for 4 hours and 15 minutes. Additional ethylene was pressured in to maintain the pressure at 900 p.s.i.g. The total amount of ethylene added during the growth reaction was 82.6 grams. A sample of the growth product was hydrolyzed and thereafter analyzed by gas chromatography. The results of this analysis are tabulated below in Table I. The growth product analyzed 26.4 percent free olefins and 73.6 percent paraffin having a total yield of 63 percent $C_{10}$–$C_{16}$ hydrocarbons. An infrared analysis of the olefins from the hydrolyzed growth product showed that the olefins contained 0.72 percent trans olefins, 6.8 percent branched olefins, and 92.5 percent terminal vinyl olefins.

Another sample of the growth product was treated with 2 mols of triethylaluminum per mol of the phosphonium compound present, after which the insoluble complex which formed was separated off. The remaining phase was then subjected to hydrolysis, after which the hydrolyzed product was analyzed by gas chromatography. The results of this analysis are shown below in Table I.

TABLE I

| Product [1] | Product Analysis After Hydrolysis, Wt. percent | Analysis of Growth Product After Exchange Reaction |
|---|---|---|
| n-$C_4$ | 3.1 | [2] 1.4 |
| l-$C_4$ | 2.3 | [2] 0 |
| n-$C_6$ | 5.3 | 6.0 |
| l-$C_6$ | 2.7 | 4.4 |
| n-$C_8$ | 6.9 | 9.8 |
| l-$C_8$ | 3.9 | 6.1 |
| n-$C_{10}$ | 11.4 | 11.8 |
| l-$C_{10}$ | 5.5 | 6.0 |
| n-$C_{12}$ | 13.5 | 12.3 |
| l-$C_{12}$ | 4.3 | 4.9 |
| n-$C_{14}$ | 12.3 | 11.5 |
| l-$C_{14}$ | 3.5 | 3.7 |
| n-$C_{16}$ | 9.9 | 8.7 |
| l-$C_{16}$ | 2.3 | 1.8 |
| n-$C_{18}$ | 6.9 | 5.9 |
| l-$C_{18}$ | 1.2 | 1.2 |
| n-$C_{20}$ | 4.3 | 4.0 |
| l-$C_{20}$ | 0.7 | Trace |

[1] n indicates straight chain paraffins and l indicates linear-olefins.
[2] This indicates that $(C_4)_3Al$ compounds have some solubility in complex phase.

*Example III*

A run was also carried out in which triethylaluminum was exchanged with a higher molecular weight trialkyl- aluminum which was complexed with methyl triphenylphosphonium bromide.

In this run, 25.2 grams of tri-n-decylaluminum was added to 10 grams (0.028 mol) of methyl triphenylphosphonium bromide. A single phase, soluble in cyclohexane, was formed. Addition of 0.056 mol of triethylaluminum caused an insoluble phase to separate. A slight excess of triethylaluminum was added and it was noted that the volume of the insoluble phase decreased slightly, so no more was added. The triethylaluminum in all cases was charged as a 25 weight percent solution in cyclohexane. At this time an additional 122.6 grams of cyclohexane was added to the mixture. The upper layer was then drawn off and a 10 ml. sample of this material was hydrolyzed. The hydrolyzed product was then analyzed by gas chromatography. If complete separation had been obtained, this upper layer would have analyzed 85.8 weight percent cyclohexane and 14.2 weight percent tridecylaluminum. The analysis showed the upper layer to contain 87.5 weight percent cyclohexane and 12.5 weight percent tridecylaluminum, thus 88.1 percent of the tridecylaluminum in the complex exchanged with the added triethylaluminum.

Various modifications of this invention can be made, or followed, in view of the foregoing disclosure, without departing from the spirit or scope thereof.

We claim:

1. As a new composition of matter, a complex of a phosphonium compound of the formula $(R)_4PX$ wherein each R is selected from the group consisting of alkyl, aryl, aralkyl and cycloalkyl radicals containing from 1 to 10 carbon atoms and X is selected from the group consisting of Cl, Br and I, and a trialkylaluminum compound of the formula $(R')_3Al$ wherein each R' is an alkyl radical generally containing from 1 to 20 carbon atoms, wherein the trialkylaluminum compound is present in the range of from 1 to 2 moles per mole of the phosphonium compound.

2. A composition according to claim 1 consisting of a complex of methyl triphenylphosphonium bromide and triethylaluminum.

3. A process for the preparation of 1-olefins which comprises the steps of:
(a) converting triethylaluminum to a higher molecular weight trialkylaluminum by reaction with ethylene in the presence of a diluent,
(b) adding additional ethylene to the system under decreased pressure so as to convert the higher molecular weight trialkylaluminums to a mixture of triethylaluminum and 1-olefins,
(c) contacting the resulting mixture of diluent, triethylaluminum and 1-olefins with a phosphonium compound of the formula $(R)_4PX$ wherein each R is selected from the group consisting of alkyl, aryl, aralkyl, alkaryl and cycloalkyl radicals containing from 1 to 10 carbon atoms and X is selected from the group consisting of Cl, Br and I, thereby forming an insoluble complex having a mole ratio of triethylaluminum to phosphonium compound of 2:1,
(d) separating the resulting insoluble triethylaluminum-phosphonium complex from the resulting mixture, and
(e) thereafter recovering the 1-olefins as a product of the process.

4. The process of claim 3 wherein the triethylaluminum-phosphonium complex is prepared at a temperature from −10 to 150° C.

5. A process according to claim 3 wherein the resulting triethylaluminum-phosphonium complex is subjected to pyrolysis so as to form triethylaluminum and a phosphonium complex which is capable of complexing with additional triethylaluminum, and the triethylaluminum is recycled for use in the initial reaction of ethylene with triethylaluminum.

6. A process for the formation of 1-olefins which comprises the steps of:
   (a) reacting ethylene in the presence of a diluent with a complex of triethylaluminum and a phosphonium compound of the formula $(R)_4PX$ wherein each R is selected from the group consisting of alkyl, aryl, aralkyl, alkaryl, and cycloalkyl radicals containing from 1 to 10 carbon atoms and X is selected from the group consisting of Cl, Br and I, said complex containing 1 mole of said phosphonium compound and 2 moles of triethylaluminum therein,
   (b) treating the resulting reaction mixture with additional ethylene at a decreased pressure so as to form a mixture comprising a soluble higher molecular weight trialkylaluminum-phosphonium complex, an insoluble triethylaluminum-phosphonium complex and 1-olefins,
   (c) separating the insoluble triethylaluminum complex from the mixture and recycling same to step (a),
   (d) contacting the soluble trialkylaluminum-phosphonium complex with triethylaluminum, separating and recycling the resulting insoluble triethylaluminum-phosphonium complex to step (a),
   (e) hydrolyzing the resulting higher molecular weight trialkylaluminum compound, and
   (f) thereafter recovering the 1-olefins as a product of the process.

7. A process for the preparation of 1-olefins which comprises:
   (a) reacting ethylene in the presence of a diluent with a complex comprising triethylaluminum and a phosphonium compound of the formula $(R)_4PX$ wherein each R is selected from the group consisting of alkyl, aryl, aralkyl, alkaryl and cycloalkyl radicals containing from 1 to 10 carbon atoms and X is selected from the group consisting of Cl, Br and I,
   (b) adding triethylaluminum to the reaction so as to form an insoluble complex of triethylaluminum and the phosphonium compound, said insoluble complex containing 1 mole of said phosphonium compound and 2 moles of triethlaluminum therein,
   (c) separating the resulting insoluble complex from the resulting reaction mass and recycling said complex to step (a),
   (d) passing the remainder of the mixture comprising diluent, 1-olefins and higher trialkylaluminums to a stripping zone,
   (e) stripping the constituents boiling below the trialkylaluminums and passing the remainder of the mixture to a thermal displacement zone,
   (f) adding ethylene to the system so as to convert the trialkylaluminums to triethylaluminum and 1-olefins,
   (g) thereafter separating and recycling the lighter 1-olefins and triethylaluminum, and
   (h) recovering the desired 1-olefins as a product of the process.

References Cited
UNITED STATES PATENTS

| | | | |
|---|---|---|---|
| 2,962,487 | 11/1960 | Coover et al. | 252—431 X |
| 3,096,385 | 7/1963 | McConnell et al. | 252—431 X |
| 3,278,262 | 10/1966 | Poe et al. | 260—685.15 |

FOREIGN PATENTS 586,449   12/1958   Italy.

DELBERT E. GANTZ, *Primary Examiner.*

R. H. SHUBERT, G. J. CRASANAKIS, *Examiners.*